INVENTOR
Earl F. Schaefer
BY
ATTORNEYS

United States Patent Office 2,895,846
Patented July 21, 1959

2,895,846

PROTECTIVE COATING FOR DECORATED GLASSWARE AND METHOD OF APPLICATION

Earl F. Schaefer, Toledo, Ohio, assignor to Owens-Illinois Glass Company, a corporation of Ohio Application May 25, 1955, Serial No. 511,057

2 Claims. (Cl. 117—12)

The present invention relates to decorated glassware and more specifically to a protective coating for the preservation of decorative and printed designs on glass bottles, jars or other such ware and a simple, convenient method of application of the coating.

The designs are usually composed of printing inks which may be applied by any one of numerous methods of application such as printing, stenciling or silk screening. The fixation of the designs is usually accomplished by the application of heat to permanently fuse the printing ink onto the glass, the temperature level required depending primarily upon the composition of the ink.

One of the most outstanding shortcomings of printing ink formulations for decorating glassware is their lack of durability when subjected to exposure to water and water vapor for prolonged periods or for shorter periods during cleaning of the glassware. The decorative designs are weakened by such exposure and rendered more susceptible to removal by scratching or abrasive contact with other surfaces. Thus, in compounding printing inks for decorative purposes it is essential that their resistance to water and abrasion be evaluated prior to their adoption and use.

Accordingly, it is a principal object of this invention to provide a protective coating for decorative designs on glassware which coating is firmly bonded to the external surfaces of said designs to markedly improve their resistance to water and abrasion as well as to minimize the limiting tendencies of these properties in the adoption and use of many of the ink compositions.

Another object of this invention is to provide a protective coating for decorative designs on glassware which is adaptable to application as part of the normal decorating fixing step after hot or cold color applications of the decorating materials.

The specific nature of this invention, as well as other objects and advantages thereof, will become apparent to those skilled in the art from the following detailed description taken in conjunction with the annexed sheet of drawings, on which by way of preferred example only, is illustrated one embodiment of this invention.

Referring to the accompanying drawings.

Figure 1:
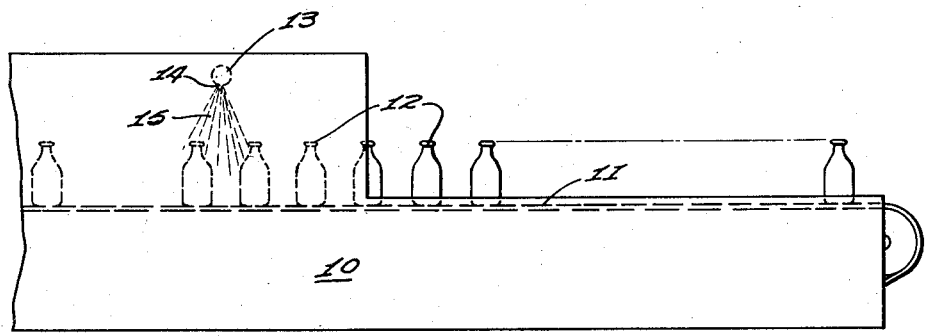
Fig. 1 is a fragmentary side elevational view of the discharge end of a conventional decorating lehr showng the interior in broken lines.
Figure 2:
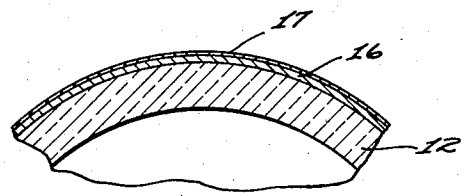
Fig. 2 is a fragmentary sectional plan view of a bottle wall.

In the illustration of an embodiment of my invention the discharge end portion of a conventional decorating lehr 10 is shown in Fig. 1 with a continuous traveling conveyor 11 formed of reticulated material upon which the decorated products are finished. The decorated products consist of glass bottles 12 or other similar glass articles which are carried upon the continuously moving conveyor 11 through the desired temperature zones of the lehr 10 at a controlled rate of speed in the decoration fixing operation. In Fig. 1 the glass bottles 12 are shown spaced apart within the lehr 10 in upright positions upon the conveyor 11.

Figure 3:
Fig. 3 is a side elevational view of a decorated bottle.

The external surfaces of the bottles 12 are decorated with printing ink designs 16, one bottle being shown in Fig. 3 with the decorated letter X, prior to the application of the protective coating. The decorating bottles 12 are carried through the lehr 10 for the required length of time at the proper temperature levels to properly fuse or bake the designs 16 onto the glass. The designs 16 may be applied hot or cold prior to the fusing or baking operation depending upon the type of printing ink composition employed and the method of application selected. As is customary in the expedient manufacture of decorated glass bottles the designs 16 after their proper application in unfixed form are permanently fused to the glass within the decorating lehr 10 or a similar baking oven usually by heating the bottles 12 to a temperature in excess of 450° F.

The majority of printing inks used for decorative purposes on glassware contain silicone resins to obtain the most desirable properties of clearly defined and firmly bonded decorative patterns. In the present invention the use of printing inks containing silicone resins is preferable although satisfactory results have been obtained with ordinary printing inks which do not contain silicone resins.

In my invention the decorated glass bottles 12 are coated with a protective film 17 of silicone material while passing through the lower temperature zone of the lehr tunnel at its discharge end. The silicone material consists of a synthetic silicone resin which forms a thin film 17 over the decorated surfaces of the baked printing ink designs 16 and the surrounding glass surfaces of the bottles 12.

The silicone material comprising the protective film 17 may be applied over the printing ink designs 16 by vaporizing a solution containing a silicone compound onto the bottles 12 by the use of heat. The commercially available silicone solutions are generally composed of silicone resins of mixed siloxane copolymers having volatile aromatic hydrocarbons as their solvents. The use of such organic solutions is objectionable in commercial practice in that solvent recovery systems are needed and some hazard exists in connection with the volatile solvents being flammable.

I have found that a practical and easy method of application is to apply the silicone film 17 in the form of a water emulsion by spraying or fogging the aqueous solution into the lehr 10 during the latter stages of the decorating operation. Thus, the permanent fixation of both the decorating material and the protective coating can be accomplished in one operation. The organic silicone material is diluted with water to form an aqueous emulsion containing only a small amount of the silicone. Any of the commercial silicone emulsions which on polymerization give high water repellency to glass and which can be dispersed in water may be used. Examples suitable in this regard are the product of General Electric Corporation identified as "SM-70," and a product of Dow-Corning Corporation identified as "EF-4010."

The concentration of the silicone in the aqueous emulsion is adjusted to from 0.5 to 2.0 percent, the amount, however, not being critical for satisfactory deposition of the film. The film 17 is quite thin, being much thinner than the decorative design 16. With the silicone comprising an emulsion in water no special precautions against combustion or solvent recovery systems are required.

Spray equipment of any conventional type may be used within the lower temperature range of the lehr 10 relatively near the discharge end. The preferable type of spray pattern is produced within the lehr 10 by a manifold 13 extending transversely across the upper portion of the lehr 10 with suitable spray nozzles 14 directed downward toward the upright bottles 12. The spray pattern is directed downward directly over the tops of the bottles 12 to insure complete coverage. The manifold 13 is constructed to be adjustable for height over the bottles 12 to allow various size bottles to be spray coated. The adjustability of the manifold 13 also permits control over the amount of silicone deposited. The spray manifold 13 is located within the lehr 10 in a position where the usual operating temperature of the ware is within the range of from 300° to 450° F. The size and shape of the spray nozzles 14 are not critical, but a type which produces a mist-like spray having fine particle size is most desirable.

It has been found that the downwardly directed spray 15 does not have to directly contact the surfaces of the bottles 12 but because of the rapid vaporization of the water of the emulsion the bottles 12 are treated either from the vaporized silicone or the silicone carried in the air currents within the lehr 10. Air currents carry the silicones along to contact the bottles 12 after the water of the emulsion has been vaporized by the heat of the lehr. Thus, good coverage of the external surfaces of the bottles over their decorated and undecorated external surfaces is obtained without direct impingement of a liquidus phase of the emulsion. The silicone film 17 is comprised of a low molecular, invisible layer over the decorated design 16 and the glass bottle 12 which causes both to become water repellent. Sufficient material is sprayed over the bottle to give a thin silicone coating high in water repellency.

Normal operation of the decorating lehr 10 allows sufficient time to cure the silicone coating as well as the printing ink designs. By applying the silicone as an adjunct to the decorating operation its application may be accomplished at very nominal cost. Water resistance of the printed designs is increased many fold and the designs are made considerably more durable.

The silicone coating or film 17 is most effective when used with a printing ink incorporating a silicone resin in its composition because of the chemical bond which is established between the silicones of the ink and the coating. The temperature range of 300 to 450° F. in which the spray 15 is applied furnishes a very suitable condition for the establishment of silicone bonding reactions. The silicone coating applied at the time of baking of the ink thus chemically bonds directly to the silicone of the ink itself when such decorating inks are employed, creating a more water-proof and abrasion resistant coating than is obtained without the finishing treatment of the silicone coating. The coating can also be employed beneficially with inks which do not contain silicone as an ingredient, as such coating becomes firmly bonded to the constituents of ordinary printing inks primarily due to the heat of baking.

Various modifications of this invention may be resorted to within the spirit and scope of the appended claims.

I claim:

1. The method of producing a decorated glass container which bears an additional protective coating capable of improving the water and abrasion resistance of the decoration, said method comprising the continuous, uninterrupted sequence of steps of (1) applying a temperature-hardenable printing ink decoration to selected areas of the glass container, (2) heating said glass container to a temperature above 450° F. to bond the printing ink decoration thereto, (3) lowering the temperature of the decorated glass container to a temperature of between 300° F. and 400° F., (4) subjecting said decorated glass container to a fine spray of an aqueous emulsion of a silicone resin constituting from 0.5% to 2.0% by weight of the total weight of emulsion until the entire external surface of the decorated glass container is provided with a uniform coating while within said range of temperature, (5) maintaining said silicone coated decorated glass container within said temperature range until said coating is cured, and (6) cooling said decorated coated container to room temperature.

2. A glass article which is the product of the method defined in claim 1.

References Cited in the file of this patent

UNITED STATES PATENTS

| | | |
|---|---|---|
| 2,023,175 | Kneip | Dec. 3, 1935 |
| 2,428,357 | Cohen | Oct. 7, 1947 |
| 2,436,304 | Johannson | Feb. 17, 1948 |
| 2,495,306 | Zurcher | Jan. 24, 1950 |
| 2,582,919 | Biefeld | Jan. 15, 1952 |
| 2,588,828 | Greiner | Mar. 11, 1952 |
| 2,726,172 | Bennett et al. | Dec. 6, 1955 |

OTHER REFERENCES

"Silicones and Their Uses" (McGregor), published by McGraw-Hill Book Company, Inc. (New York), 1954. (Page 213 relied on.)

"Printed Circuit Techniques," National Bureau of Standards Circular #468, United States Department of Commerce, National Bureau of Standards.